United States Patent [19]

Fujiwara et al.

[11] 4,332,139
[45] Jun. 1, 1982

[54] METHOD FOR STORAGE AND RECOVERY OF THERMAL ENERGY

[75] Inventors: Ichiro Fujiwara, Tokyo; Totaro Goto, Hachioji, both of Japan

[73] Assignee: The Director-General of the Agency of Industrial Science and Technology, Tokyo, Japan

[21] Appl. No.: 65,331

[22] Filed: Aug. 9, 1979

[30] Foreign Application Priority Data

Dec. 27, 1978 [JP] Japan .................. 53/163371

[51] Int. Cl.³ .................................... F25B 15/00
[52] U.S. Cl. .................................... 62/101; 62/106; 165/DIG. 17
[58] Field of Search ................ 62/101, 106, 112, 122, 62/476, 477–482; 165/DIG. 17

[56] References Cited

U.S. PATENT DOCUMENTS

| 1,452,009 | 4/1923 | Wait | 62/101 |
| 1,960,824 | 5/1934 | Munters | 62/106 |
| 2,024,083 | 12/1935 | Young | 62/106 |
| 2,045,053 | 6/1936 | Resek | 62/106 |
| 2,131,119 | 9/1938 | Root et al. | 62/106 |
| 4,062,197 | 12/1977 | Hester | 62/101 |
| 4,192,371 | 3/1980 | Derouette et al. | 165/DIG. 17 |

Primary Examiner—Lloyd L. King
Attorney, Agent, or Firm—Brisebois & Kruger

[57] ABSTRACT

The invention provides a novel method for the storage and recovery of thermal energy by utilizing a medium substance for the storage of heat. The medium substance is a liquid complex of sodium iodide and ammonia, which absorbs heat as latent heat when brought under a reduced partial pressure of ammonia to effect liberation of ammonia and releases the thermal energy as sensible heat when brought under an increased partial pressure of ammonia to absorb ammonia. Different from conventional solid medium substances for storage of heat, the liquid medium proposed is very convenient in handling so that a chemical heat pump with simple structure can be contrived by use of the inventive method.

5 Claims, 3 Drawing Figures

METHOD FOR STORAGE AND RECOVERY OF THERMAL ENERGY

BACKGROUND OF THE INVENTION

The present invention relates to a method for storage and recovery of thermal energy or, in particular, to a novel method for storage and recovery of thermal energy utilizing a medium substance for heat storage and transfer, which is not used hitherto in such a purpose, in which thermal energy can be stored as latent heat in the form of chemical energy and, when releasing of the heat is desired, the latent heat is readily and conveniently converted to sensible heat.

The invention also relates to a heat pump in which transfer of heat is effected by the above mentioned medium substance.

In recent years, there is a world-wide trend or demand for effective utilization of various thermal energies such as waste heat and solar energy as a heat source, which have been considered to be of low value owing to their diffused availability. In order to utilize these thermal energies with efficiency and convenience, it is necessary to develop a method that the thermal energy obtained from the heat source is concentrated and stored in a medium which is transported to the place where the thermal energy is utilized and the thermal energy is released as sensible heat when required.

There have been proposed various kinds of substances suitable for use as a heat-storage medium, among which one of the most promising classes utilizes the reversible exothermic and endothermic reactions in the combination reaction of reactants or decomposition reaction of a chemical compound where the thermal energy is converted into chemical energy and temporarily stored in the medium substance.

In particular, most of the prior art heat-storage method utilizes a solid compound as the medium which is decomposed endothermically with evolution of a gaseous product leaving a solid product which can be regenerated into the initial form with recovery of the thermal energy as released sensible heat.

These solid heat-storage media are defective since they are disintegrated into powder by the repeated cycles of evolution of a gas and absorption of the same gas so that the effective thermal conductivity rapidly decreases to an extent that the absorption and releasing of the thermal energy are extremely suppressed in the practical use of the medium substance. This problem is more serious when large scale use of the medium is intended. What is worse, a solid medium is inconveniently transported, for example, by use of a pump in comparison with liquid heat-storage medium substances and, when a combustible or explosive gaseous product such as hydrogen is involved in the reaction, there can be a danger of fire or explosion.

Accordingly, there has been eagerly desired to develop a heat-storage medium with high efficiency, in which large capacity for heat storage, good thermal conductivity and easiness in transportation as well as safety in handling are the key factors.

SUMMARY OF THE INVENTION

It is therefore an object of the present invention to provide a novel heat-storage medium and a method for storage and recovery of thermal energy therewith.

Thus the method of the present invention for storage and recovery of thermal energy comprises the steps of (a) supplying thermal energy to a liquid complex of sodium iodide and ammonia under a first equilibrium pressure of ammonia with simultaneous decrease of the pressure of ammonia to a second equilibrium pressure to liberate ammonia from the liquid complex whereby to effect absorption of the thermal energy into the liquid complex as latent heat, and (b) subjecting the liquid complex with the thus decreased content of ammonia under the second equilibrium pressure to the first equilibrium pressure to regenerate the liquid complex with the content of ammonia before the absorption of the thermal energy whereby to convert the latent heat to sensible heat.

DETAILED DESCRIPTION OF THE PREFERRED EMBODIMENTS

It is known that sodium iodide absorbs and reacts with gaseous ammonia at room temperature to form a complex typically expressed by the formula $NaI \cdot nNH_3$, where n is a positive number, and, as the partial pressure of ammonia is increased to the absorption of in excess of approximately 2.7 moles of ammonia per mole of sodium iodide, i.e. when n in the above formula is approximately equal to 2.7 or larger, the complex is a colorless, transparent liquid.

The complex of sodium iodide and ammonia is not always liquid but can be solid depending on the partial pressure of ammonia and the temperature. When placed under such conditions, the complex is at first a slurry composed of the liquid complex and the solid complex but the slurry is completely solidified with the lapse of time.

Figure 1:
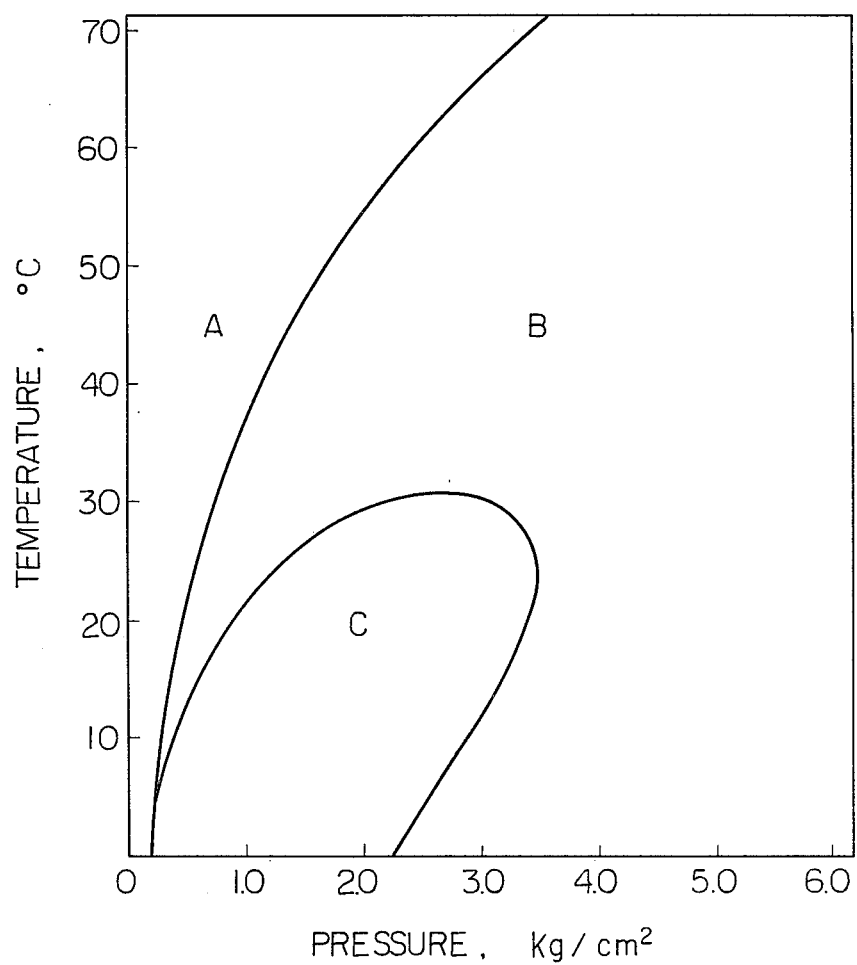
FIG. 1 is a pressure-temperature equilibrium diagram of sodium iodide-ammonia complexes.

This situation is well illustrated in FIG. 1 showing the pressure-temperature equilibrium diagram of the sodium iodide-ammonia complexes. In the figure, the area shown by A is the region where the partial pressure of ammonia is low so that no liquid complex is formed and the area shown by C is the region where the stable phase is the solid complex so that, even if the complex is in a slurried state at first, the complex is wholly solidified. Both of these regions A and C are not suitable for the use of the complex as the heat-storage medium.

On the contrary, the area shown by B is the region where the liquid complex of sodium iodide and ammonia is the stable phase. That is, the liquid complex of sodium iodide and ammonia to be used in the present invention is desirably under the pressure and temperature conditions falling within this region. It is of course permissible that small amounts of solid complex are contained as slurried in the liquid complex insofar as no noticeable drawbacks are encountered in the storage and transportation of the liquid complex.

In particular, the liquid complex of sodium iodide and ammonia to be used as the heat-storage medium in the inventive method is desirably kept and handled under an ammonia partial pressure of 1 Kg/cm² or larger when the temperature is 32° C. or higher and 3.5 Kg/cm² or larger when the temperature is below 32° C.

Figure 2:
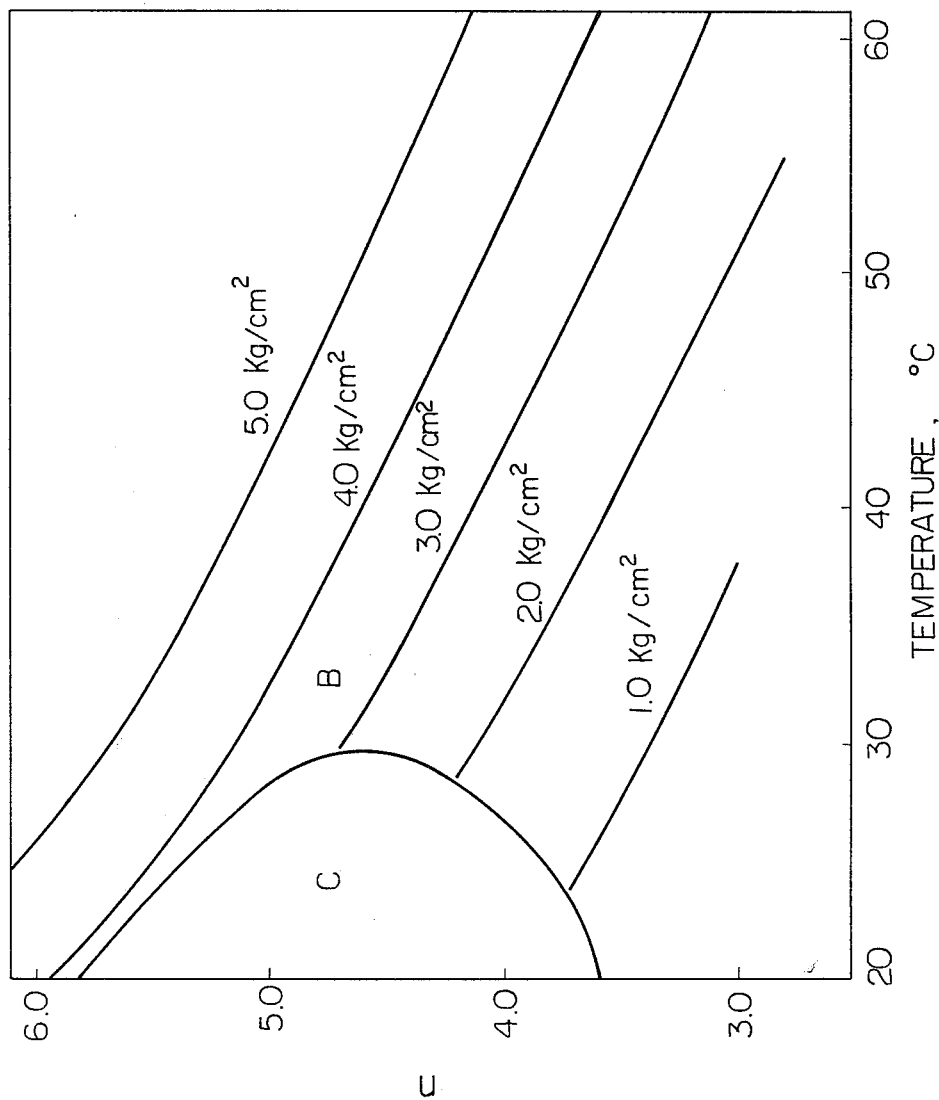
FIG. 2 shows the molar ratio of ammonia to sodium iodide in the sodium iodide-ammonia complex as a function of the temperature of ammonia at varied partial pressures.

Further, FIG. 2 illustrates the molar ratio of ammonia to sodium iodide in the complex as a function of the temperature at varied partial pressures of ammonia. In this figure, the area shown by B corresponds to the conditions under which the complex is in the liquid state and the area shown by C corresponds to the coexistence of the complexes both in the liquid and solid states.

As is understood from these FIG. 1 and FIG. 2, the changes in the temperature and ammonia partial pressure are always accompanied by the absorption or liberation of ammonia into or from the liquid complex. As has been established by the inventors, the absorption and liberation of ammonia into and from the liquid complex are exothermic and endothermic reactions, respectively, corresponding to several kilocalories of heat of reaction per mole of ammonia depending on the operational conditions of pressure and temperature. For example, about 7.2 kilocalories of heat is evolved per mole of ammonia absorption when the pressure is increased from 1 Kg/cm² to 5 Kg/cm² at 35° C.

Accordingly, when a liquid complex of sodium iodide and ammonia under equilibrium with a partial pressure of ammonia is brought under a lower partial pressure of ammonia, there takes place an endothermic reaction with liberation of gaseous ammonia so that the heat from the heat source is absorbed through the vessel walls into the liquid complex as latent heat.

On the other hand, when the liquid complex with decreased content of ammonia as produced in the above liberation step is brought under an increased partial pressure of ammonia, then the ammonia is absorbed into the liquid complex to enhance the ammonia content in the liquid complex which is accompanied by releasing of the latent heat as sensible heat.

The physical properties of the complex of sodium iodide and ammonia used in the inventive method depend largely on the ammonia/sodium iodide molar ratio, i.e. the value of n in the formula. For example, the density of the liquid complex varies in the range from 1.0 g/cm³ to 1.6 g/cm³ and the viscosity of the liquid complex is in the range from 0.2 to 2.0 centipoise, both at room temperature.

In practicing the method of the invention, the liquid complex of sodium iodide and ammonia contained in a pressurized vessel is heated with a heat source, e.g. waste or solar heat, to liberate ammonia with heat absorption and the thus produced liquid complex with decreased content of ammonia is stored or transported under a lower equilibrium partial pressure of ammonia corresponding to the decreased ammonia content in the liquid complex. When the thermal energy contained in the liquid complex as latent heat is to be recovered, the liquid complex is brought under an increased partial pressure of ammonia so that the liquid complex absorbs ammonia to regain the ammonia content before the liberation of ammonia with releasing of the thermal energy as sensible heat.

Figure 3:
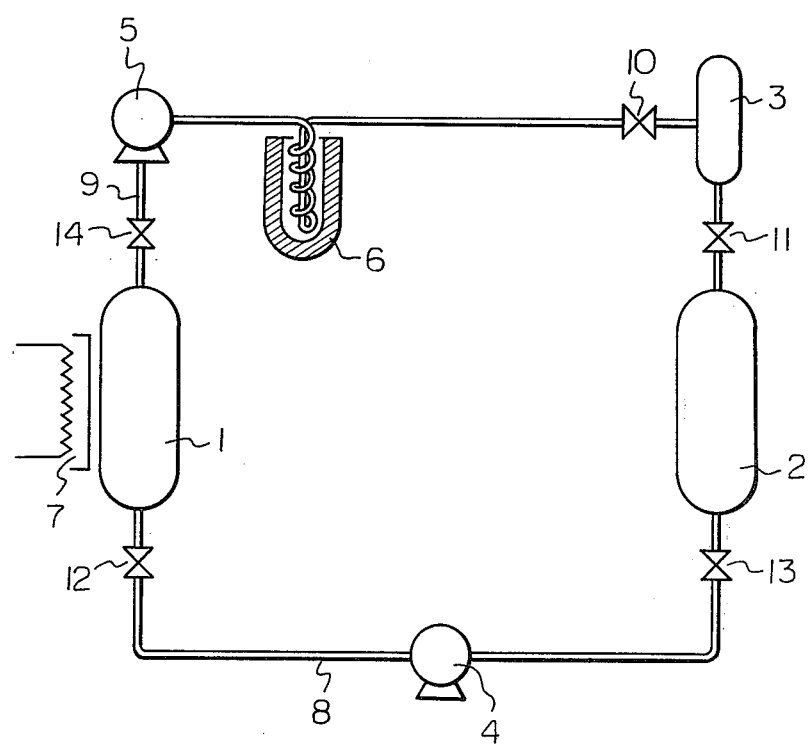
FIG. 3 is a schematic illustration of a heat pump as an apparatus for practicing the inventive method.

FIG. 3 is a schematic illustration of the principle in heat pump as an apparatus suitable for practicing the method of the invention.

In the figure, the liquid complex of sodium iodide and ammonia as the heat-storage medium is contained in the heat absorber 1, where the liquid complex is heated by the heat source 7 through the walls of the heat absorber 1 with the valve 12 closed whereby certain volumes of ammonia are liberated from the liquid complex to decrease the ammonia content in the liquid complex. The thus liberated gaseous ammonia is drawn by the pump 5 through the duct 9 with the valve 14 opened and introduced into the condenser 6 where it is chilled and liquefied and further sent to the vessel 3 for the liquid ammonia with the valve 10 opened and the valve 11 as closed.

On the other hand, the liquid complex with decreased ammonia content is drawn from the heat absorber 1 by means of the pump 4 through the valve 12 and the duct 8 and transferred into the heat regenerator 2.

When the thermal energy is to be recovered in the heat regenerator 2, the valve 11 is opened, the valves 10 and 13 being kept as closed, so that the partial pressure of ammonia in the heat regenerator 2 is increased whereby the liquid complex in the heat regenerator 2 absorbs the ammonia with releasing of the latent heat as sensible heat.

When an equilibrium is established in the heat regenerator 2 and absorption of ammonia by the liquid complex is no longer taking place, the valve 11 is closed and the liquid complex with increased ammonia content is sent back to the heat absorber 1 through the duct 8 by opening the valves 12 and 13 and operating the pump 4 reversingly.

In the above described apparatus, the liquid complex is transferred reciprocatively back and forth between the heat absorber 1 and the heat regenerator 2 through the duct 8 while ammonia is circulated in the direction from the heat absorber 1 to the liquid ammonia vessel 3 to the heat regenerator 2 as free ammonia and from the heat regenerator 2 to the heat absorber 1 as combined in the liquid complex. On the other hand, the thermal energy supplied by the heat source 7, such as the heat from an absorber plate of solar heat energy or waste heat in various kinds of processes such as in chemical plants and electric power plants, is transferred from the heat absorber 1 to the heat regenerator 2 through the duct 8 as borne on the liquid complex as latent heat.

In this case, the liquid complex of sodium iodide and ammonia as well as the ammonia liberated from the liquid complex are transferred by piping but it is of course optional that they are transported as contained in closed pressurized vessels according to need.

As is understood from the above description, the materials to be transferred in the inventive method are all in liquid or gaseous states so that the difficult problems inherent to the transportation of solid materials can be completely obviated by using simple means of piping and pumping. In addition, the storage density of the thermal energy in the liquid complex is considerably large to permit full industrialization of the process according to the invention.

What is more important in the present invention is that the releasing of the latent heat from the liquid complex can be effected at a temperature even higher than in the absorption of the thermal energy to the liquid complex. For example, the absorption of thermal energy by the liquid complex may be carried out at a relatively low temperature of, say, 35° C. to effect decomposition of the liquid complex to liberate ammonia while the liquid complex with the thus reduced ammonia content can be pressurized with ammonia to release the latent heat with increase of the temperature up to 60° to 70° C. or even higher where releasing of the latent heat is continued until an equilibrium is established under the increased partial pressure of ammonia. Therefore, the thermal energy can be transferred from a heat source of 35° C. or lower to the heat regenerator at 60° to 70° C. or higher, thus providing a practical heat pump means or a so-called chemical heat pump means.

In the following, examples are given to illustrate the method and the heat pump of the invention in further detail.

EXAMPLE 1

Into a pressurizable vessel was introduced sodium iodide and the vessel was evacuated by means of a vacuum pump. Then, ammonia gas was gradually introduced into the vessel while the temperature was kept constant at 32° C. When the pressure of ammonia reached about 0.7 Kg/cm$^2$ absolute (all of the values of pressure given hereinafter are in absolute pressure), sodium iodide and ammonia were combined to form a liquid complex under the pressure of ammonia.

By further increase of the pressure of ammonia, remarkable temperature elevation was recorded and it was necessary to cool the vessel from outside in order to keep the temperature at 32° C. The heat evolved isothermally in the course of pressure increase from 1 Kg/cm$^2$ to 6 Kg/cm$^2$ amounted to about 130 calories per gram of sodium iodide.

In the next place, the pressure of ammonia in the vessel was decreased isothermally at 32° C. and it was noted that remarkable heat absorption took place by the endothermic decomposition reaction of the liquid complex to liberate ammonia. The reversibility of the process was established by the exact measurement of the heat absorbed in the course of pressure decrease from 6 Kg/cm$^2$ to 1 Kg/cm$^2$, which was identical with the heat evolved in the pressure increase from 1 Kg/cm$^2$ to 6 Kg/cm$^2$.

EXAMPLE 2

The liquid complex obtained in Example 1, which was in equilibrium with ammonia of 6 Kg/cm$^2$ pressure at 32° C., was heated as contained in the vessel to 50° C. and the pressure of ammonia was decreased to 2 Kg/cm$^2$. During these changes in the temperature and pressure, the heat absorbed by the liquid complex amounted to about 170 calories per g of sodium iodide.

The above process was reversed by cooling the liquid complex to 32° C. and increasing the pressure of ammonia to 6 Kg/cm$^2$ to find that almost the same quantity of heat was released as sensible heat as in the above heat absorption process. The storage density of heat between two equilibrium states was about 210 calories per ml of the liquid complex under the equilibrium ammonia pressure of 2 Kg/cm$^2$ at 32° C.

EXAMPLE 3

A liquid complex of sodium iodide and ammonia was prepared at 45° C. under an equilibrium ammonia pressure of 2.3 Kg/cm$^2$ and the partial pressure of ammonia over the liquid complex was increased to 5.7 Kg/cm$^2$ whereby heat was evolved so that it was necessary to cool the liquid complex from outside in order to avoid an excessive temperature elevation of the liquid complex. The overall heat evolved until an equilibrium was established at 45° C. under an ammonia partial pressure of 5.7 Kg/cm$^2$ amounted to about 61 kilocalories per kg of sodium iodide.

On the other hand, the power consumption in the compressor used for pressurizing ammonia from 2.3 Kg/cm$^2$ to 5.7 Kg/cm$^2$ was about 5.8 kilocalories giving a coefficient of performance of the heat pump means of about 10.5 at 45° C.

When the operating temperature of the above heat pump means in the releasing of the latent heat was increased to 55° C. instead of 45° C., the heat evolved amounted to about 35 kilocalories per kg of sodium iodide giving a coefficient of performance of about 6.

What is claimed is:

1. A method for storage and recovery of thermal energy which comprises the steps of
    (a) supplying thermal energy to a liquid complex of sodium iodide and ammonia initially at a first ammonia equilibrium pressure while simultaneously decreasing the pressure to a second equilibrium pressure to liberate ammonia from the liquid complex thereby storing the thermal energy as latent heat of combination of the ammonia and the complex, and subsequently,
    (b) recovering the thermal energy by subjecting the liquid complex with the thus decreased content of ammonia and at the second equilibrium pressure, to ammonia at the first equilibrium pressure to regenerate the liquid complex to the initial content of ammonia before the absorption of the thermal energy to thereby convert the latent heat of combination of the ammonia and the complex to sensible heat.

2. The method as claimed in claim 1 wherein the molar ratio of ammonia to sodium iodide in the liquid complex at said first equilibrium pressure is at least 2.7.

3. The method as claimed in claim 1 wherein the partial pressure of the ammonia over the liquid complex of sodium iodide and ammonia is maintained at at least 1 Kg/cm$^2$ when the temperature of the liquid complex is 32° C. or higher and at least 3.5 Kg/cm$^2$ when the temperature of the liquid complex is below 32° C.

4. A method for transfer of thermal energy from a first location to a second location which comprises
    (a) supplying thermal energy at the first location to a liquid complex of sodium iodide and ammonia initially at a first equilibrium pressure of ammonia while simultaneously decreasing the pressure to a second equilibrium pressure to liberate ammonia from the liquid complex thereby storing the absorbed heat as the latent heat of dissociation of ammonia from the complex,
    (b) transferring the liquid complex with the thus decreased content of ammonia and at the second equilibrium pressure from the first location to the second location, and
    (c) subjecting the liquid complex at the second location to ammonia at said first equilibrium pressure to regenerate the liquid complex to the content of ammonia before the absorption of the thermal energy, to thereby recover the heat of combination of the ammonia and the complex as sensible heat.

5. A system for storing and transferring heat from one location to another comprising
    heat absorber means at a first location for receiving thermal energy from an outside heat source, said heat absorber means including receptacle means for containing a liquid complex of sodium iodide and ammonia at a first ammonia equilibrium pressure,
    pump means for reducing the ammonia equilibrium pressure of said liquid complex in said receptacle while said absorber means absorbs heat to liberate and dissociate ammonia from said liquid complex, thereby forming a low ammonia containing complex, first valve means for selectively connecting said pump means to said receptacle, heat regenerator means at a second location for recovering absorbed thermal energy as sensible heat, transfer means for transferring the low ammonia complex from the receptacle of the heat absorber means to the heat regenerator means, second valve means for selectively connecting said receptacle to said transfer means, third valve means for selectively connecting said transfer means to said heat regenerator, condensing means for condensing the ammonia from said pump means, storing means for storing the condensed ammonia from the condensing means, fourth valve means for selectively connecting the storing means to the heat regenerator to introduce ammonia into the low ammonia complex transferred to the heat generator means by the transfer means, to recover as sensible heat, the heat of combination of ammonia with the complex and to reform the complex, said transfer means comprising means fro transferring the reformed complex from heat regenerator means to the heat absorber means, when said third valve means is open.

* * * * *